June 26, 1956 P. G. MAGANUS 2,752,302
PROCESS OF TREATING ALUMINUM WORK PIECES
Filed July 28, 1950

INVENTOR.
PAUL GUY MAGANUS
BY
Barnes, Kisselle, Laughlin & Raisch
ATTORNEYS

2,752,302

PROCESS OF TREATING ALUMINUM WORK PIECES

Paul Guy Maganus, Huntington Woods, Mich., assignor, by mesne assignments, to Warren Alloy, Warren, Mich., a copartnership Application July 28, 1950, Serial No. 176,411

4 Claims. (Cl. 204—29)

This invention relates to a plating process and, more particularly, to the plating of aluminum parts used in the assembly of, or in connection with, welding apparatus and particularly portable welding apparatus.

The tendency for aluminum work pieces to oxidize or corrode on the surface is a well-known problem and is a very serious problem in many types of work, especially in connection with welding apparatus. Welding guns, particularly portable welding guns, are, from the standpoint of weight, desirably constructed from aluminum alloys of various types. Various parts of welding guns, such as the cable connectors, make electrical contact with other parts of the gun and the surface oxidation of such parts is very objectionable since it greatly increases the electrical resistivity of the part forming the conductor. The tendency for such parts, when formed of aluminum, to oxidize is even greater in the case of welding guns which are provided with internal passages for the flow of coolant, such as water, therethrough. The surface formation of $Al_2O_3$ and $Al_2(OH)$ due to galvanic action necessitates frequent disassembly of the welding apparatus for the purpose of removing the surface oxidation on the parts which serve as electrical conductors.

This troublesome problem of surface oxidation has been reduced to at least some extent by plating the parts, but even plating does not eliminate surface oxidation to the extent that conductivity of the plated parts is not seriously impaired by surface corrosion.

It is an object of the invention to provide a method of treating aluminum work pieces, especially electrical conductors of portable welding apparatus which substantially entirely eliminates the problem of surface oxidation.

Another object of the invention is to provide a plating procedure for aluminum work pieces which renders the surface thereof less likely to corrode.

Figure 1:
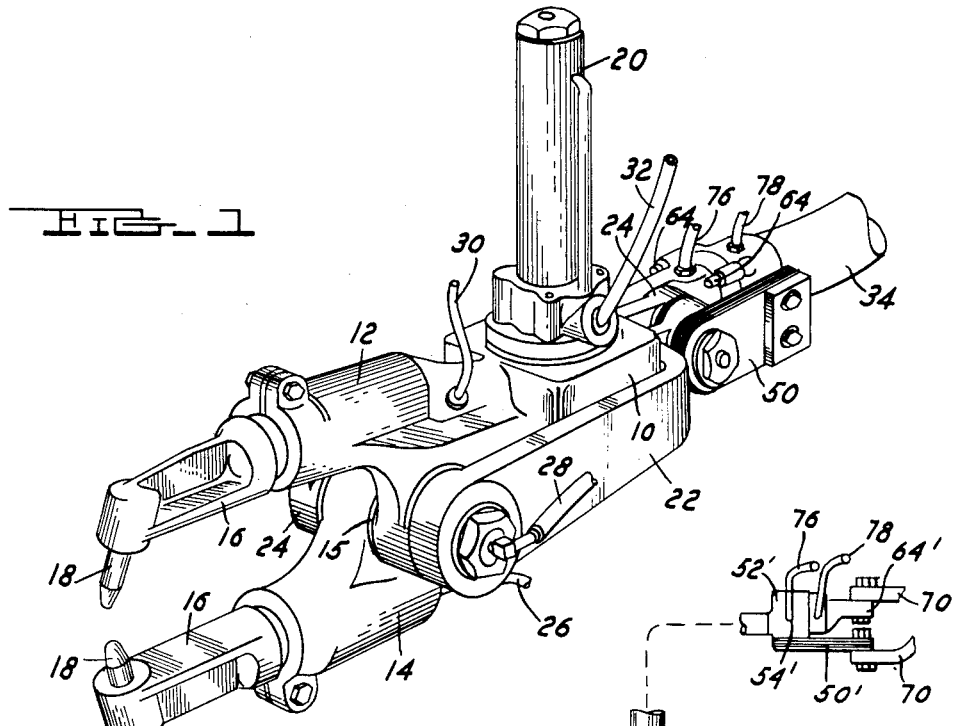
Fig. 1 is a perspective view of a portable welding gun, the pieces of which may be advantageously treated in accordance with the present invention.
Figure 2:
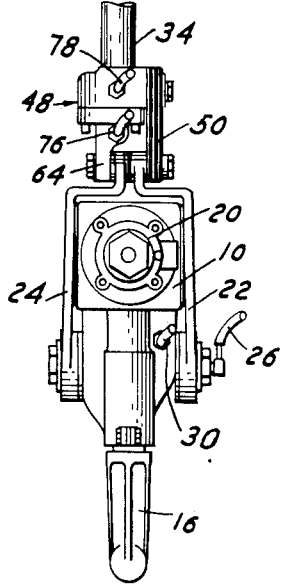
Fig. 2 is a top view of the gun illustrated in Fig. 1.
Figure 3:
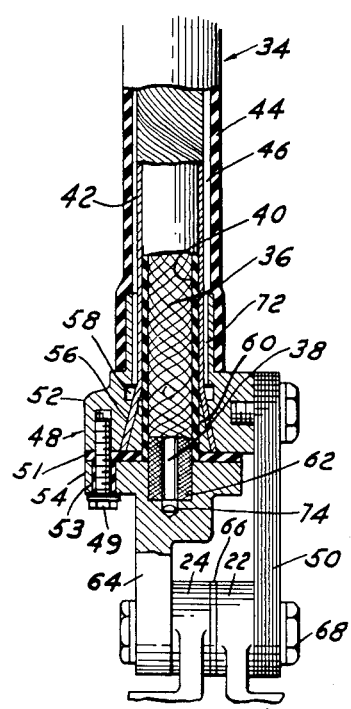
Fig. 3 is a view partly in section of an electrical conducting cable and the connector for securing the cable to the welding gun.

In the drawings there is illustrated a more or less conventional portable spot welding gun which generally comprises a head 10 having a fixed jaw 12 and a pivotally arranged jaw 14. In the end of each jaw there are arranged jaw extensions 16 which support at their outer ends opposed welding electrodes 18. Jaw 14 is pivotally actuated by means of an air cylinder 20 mounted on head 10 and operatively connected with jaw 14. The welding head is supported for pivotal movement between a pair of arms or brackets 22 and 24 which arms also serve as the means for conducting current through jaws 12 and 14 to the electrodes 18. Jaws 12 and 14 are electrically insulated from one another by an insulating disc 15.

The head and jaws of the welder are provided with internal passages, not shown, for coolant. A coolant, such as water, is directed through the cooling passages as by rubber conduits 26, 28 and 30. Air is supplied to cylinder 20 as by a conduit 32.

Current from the secondary of a transformer is conducted to the welding gun by the cable 34. Cable 34 is preferably of the type described in the U. S. patent to Purat No. 2,371,185. The construction of this type of cable is fully described in said last mentioned patent, but it may be stated that the cable generally comprises a central flexible conductor 36 which is preferably formed of stranded wires interwoven into a tubular conductor having an internal passage 38. Conductor 36 is surrounded by a flexible insulator 40 which may be formed of any suitable material, such as rubber. Another stranded electrical conductor 42 surrounds the insulating member 40. The entire assembly is enclosed within the outer tubular insulator 44 which has an internal diameter greater than the outer diameter of conductor 42 so as to provide a circumferential passage 46 between the outer surface of conductor 42 and the inner surface of insulator 44. Conductors 36 and 42 are designed to carry a relatively large welding current, and these conductors therefore necessarily comprise a great multiplicity of interwoven wires. Cables of this type are perhaps 5 or 6 feet long and tend to be relatively heavy and unwieldy. I have found that by forming conductors 36 and 42 of fine aluminum wire, the cables are of considerably less weight and yet possess a high degree of flexibility.

Conductors 36 and 42 are arranged to be electrically connected with the support arms 22 and 24 of the welding gun by connectors 48 and 50. Connector 48 is formed of two separable portions 52 and 54. These separable portions are secured together as by bolts 49 but are electrically insulated from each other by an insulator 51 interposed between the abutting faces of members 52 and 54 and insulating sleeves 53 surrounding the portion of bolts 49 extending through the portion 54 of connector 48. The connector portion 52 is provided with an axial opening having a tapered wall 56 undercut as at 58 to provide a circumferential passage. Cable 34 is secured to the connector portion 52 by flaring the end portion of conductor 42 against the tapered wall portion 56 and then inserting over the extending portions of insulator 40 and inner conductor 36 a sleeve 60 which is externally tapered to correspond with the tapered wall 56. When sleeve 60 is driven into connecting portion 52 in this manner the flared end portion of conductor 42 is securely retained between sleeve 60 and the tapered wall 56. Connector portion 54 is formed with an axially extending socket 62 in which the end of conductor 36 is secured, as by soldering or sweating.

With the cable connector above described, it will be noted that conductor 42 is electrically connected with the connector portion 52, and conductor 36 is electrically connected with connector portion 54. Connector portion 54 is fashioned with a contact arm 64, and connector 50 is bolted to the connector portion 52 so as to extend parallel to contact arm 64 but spaced therefrom a sufficient distance to accommodate therebetween the ends of support arms 22 and 24. The ends of arms 22 and 24 are separated by an insulating washer 66 and bolted to connector 50 and contact arm 64 as by bolt 68 such that arm 22 is electrically connected to connector 50, and arm 24 is electrically connected with contact arm 64.

The construction of cable 34 at its opposite end is substantially the same as that already described with the connector 50' and contact arm 64' connected with the terminals or jumper bars 70 of the transformer secondary which provides the source of current. The connector portions 52 and 52' are each provided with a passage 72 communicating with circumferential passage 58 while connecting portions 54 and 54' are each provided with a transverse passage 74 communicating with the passage 38 of conductor 36. It will be observed that the circumferential passage 58 is in communication with the passage 46 between conductor 42 and insulator 44. Suitable conduits 76 and 78 are connected with these passages for conducting coolant, such as water, through cable 34.

It will be appreciated that the above described welder and cable assembly is a rather heavy unit and any reduction in weight without materially affecting the strength or rigidity of the various parts thereof is of considerable advantage. Aluminum alloys, because of their light weight, are especially desirable for the fabrication of the various parts of the welder described. As explained previously, however, the use of aluminum alloys for these parts has heretofore been accompanied with the objectionable problem of surface oxidation. I have found that the effectiveness of plating such parts to resist surface corrosion is greatly increased if, prior to the actual plating of the parts, including the transformer secondary terminals or jumper bars 70, they are subjected to a particular treatment of impregnation which I will now describe.

As in any plating process conventionally used in aluminum, the first step in my process is cleaning the part to be plated, and this may be accomplished in any desirable manner, such as by shot blasting, pickling, etc. After the work piece is cleaned, it is immersed in a bath of drying oil, which may be tung oil, a tung oil derivative, or tung oil adulterated with other oils, such as the oil of soy bean. The tung-oil bath may vary in temperature from about 60 to 100° F., and the bath is retained within a closable vessel such that it may be subjected to considerable pressure. I have found that desirable results can be obtained when the bath containing the part being treated is subjected to a pressure from about 50 lbs. per sq. in. for 4 hrs. to 2,000 lbs. per sq. in. for about 10 mins. This treatment, I have found, thoroughly impregnates at least the surface portions of the part being treated. Thereafter the part is removed from the tung-oil bath and wiped clean of the excess tung oil. The work piece is then heated in an oven at a temperature from about 150 to 400° F. for a length of time sufficient for polymerization of the tung oil to take place. The time of baking, of course, varies with the baking temperature and with the size of the work piece being treated, but it may be stated that the impregnated work piece is removed just before the tung oil begins to turn brown.

After the work piece is subjected to the above described treatment, it may be plated in a conventional manner, such as by first cleaning in a suitable alkali bath, then subjecting it to a sodium zincade treatment for the purpose of depositing a flash zinc on the surface of the aluminum, then copper plating, and finally overplating with nickel.

When an aluminum work piece is treated in accordance with the above procedure, I have found that the tendency for the surface of the work piece to oxidize is substantially entirely eliminated. Although I am unable to state exactly the reason therefor, I am of the opinion that the polymerized tung oil plugs up the tiny pores in the part being treated and thereby prevents a galvanic action from taking place between two electrically connected members of different cathodic potentials. Furthermore, it is generally well known that a plated work piece has many small pits in the plated surface thereof. These pits are more apt to occur where the base on which the plating is applied is somewhat porous. It is therefore believed that the tung-oil treatment above described not only plugs up the tiny pores in the work piece to prevent the passage of water therethrough and thereby prevent galvanic action but also enables the production of a less porous and more uniform plating on the surface of the work piece which protects the surface of the work piece.

It will thus be seen that the parts of the welding apparatus above described, including the cable connectors, when formed of aluminum and subjected to the plating procedure described herein, possess very desirable properties. Such parts are of comparatively light weight but are not subject to surface corrosion to any appreciable extent. Welding apparatus treated in this manner has been subjected to use for considerable periods of time without the formation of any appreciable amount of surface corrosion, and the necessity for repeatedly disassembling the apparatus for the purpose of cleaning the corroded portions thereof is thereby eliminated.

I claim:

1. The process of forming a lightweight, electrical conducting work piece which is characterized by a high electrical conductivity after extended periods of use which comprises forming the work piece as an aluminum alloy casting, filling the tiny pores on the surface of the casting under super atmospheric pressure with a tung oil which is adapted to be retained in place in said pores by polymerization to form an insoluble solid which is chemically inert toward said alloy, cleaning said casting to remove the excess of said tung oil, polymerizing said tung oil in situ in said pores, and thereafter plating the surface of said casting by electro-deposition with a corrosion-resistant metal.

2. The process of forming a lightweight, electrical conducting work piece which is characterized by a high electrical conductivity after extended periods of use which comprises forming the work piece as an aluminum alloy casting, immersing the casting in a bath of tung oil maintained under super-atmospheric pressure for a period of time sufficient to enable the tung oil to penetrate into and fill the tiny pores on the surface of the casting, removing the excess tung oil from the surface of the casting, polymerizing said tung oil in stiu in said pores to form an insoluble solid which is chemically inert toward said alloy and thereafter plating the surface of said casting by electro-deposition with a corrosion-resistant metal.

3. The process as called for in claim 2 wherein said tung oil bath is maintained at a pressure within the range of about 50 to 2,000 pounds per square inch and for a period of time from about two hours to ten minutes.

4. The process as called for in claim 3 wherein said tung oil bath is maintained at a temperature within the range from about 60° to 100° F.

References Cited in the file of this patent

UNITED STATES PATENTS

| | | |
|---|---|---|
| 593,440 | Shuman | Nov. 9, 1897 |
| 1,757,118 | Harris | May 6, 1930 |
| 2,047,889 | Roskosky | July 14, 1936 |
| 2,069,247 | Hoag | Feb. 2, 1937 |
| 2,100,258 | Larson | Nov. 23, 1937 |
| 2,142,564 | Korpiun | Jan. 3, 1939 |
| 2,301,332 | Scheller | Nov. 10, 1942 |
| 2,400,473 | Strickland | May 14, 1946 |
| 2,412,528 | Morrell | Dec. 10, 1946 |
| 2,419,190 | Wagoner | Apr. 15, 1947 |
| 2,462,458 | Beymer | Feb. 22, 1949 |
| 2,464,054 | Panik | Mar. 8, 1949 |
| 2,513,365 | Rogoff | July 4, 1950 |

OTHER REFERENCES

De Long: Light Metal Age, May, 1944, pp. 10–11, 18. (Copy in Scientific Library, 117–134.)

Knight: Metals and Alloys, vol. 20 (1944), article on pp. 1625–30, pages 1625–6 relied on, 117–134. (Copy in Scientific Library.)